United States Patent [19]

Bauer et al.

[11] Patent Number: 5,359,777
[45] Date of Patent: Nov. 1, 1994

[54] CUTTERHEAD FOR A STRING TRIMMER

[75] Inventors: Peter Bauer, Winnenden; Horst Eckhardt, Auenwald; Roland Schierling, Affalterbach; Joachim Hoffmann, Aichwald, all of Germany

[73] Assignee: Andreas Stihl, Waiblingen, Germany

[21] Appl. No.: 63,663

[22] Filed: May 20, 1993

[30] Foreign Application Priority Data

May 22, 1992 [DE] Germany .............................. 4217028
Apr. 14, 1993 [DE] Germany .............................. 4212135

[51] Int. Cl.$^5$ .............................................. A01G 3/06
[52] U.S. Cl. ...................................... 30/276; 30/347; 56/12.7
[58] Field of Search ..................... 30/272.1, 276, 347; 56/12.7, 12.5

[56] References Cited

U.S. PATENT DOCUMENTS

| | | | |
|---|---|---|---|
| 4,169,311 | 10/1979 | Everson et al. | 56/12.7 X |
| 4,253,238 | 3/1981 | Sheldon | 56/12.7 X |
| 4,571,831 | 2/1986 | White, III | 30/276 |
| 4,805,306 | 2/1989 | Baba | 30/276 |
| 4,893,410 | 1/1990 | Hoffmann et al. | 30/276 |

Primary Examiner—Eugenia Jones
Assistant Examiner—Kenneth E. Peterson
Attorney, Agent, or Firm—Walter Ottesen

[57] ABSTRACT

A cutterhead for a string trimmer having a rotatable drive shaft is adapted to hold and meter a cutting filament during operational use thereof. The cutterhead includes a disc-like carrier fixedly connected to one end of the drive shaft to permit the carrier to rotate about a rotational axis. The carrier has a peripheral edge and a peripherally extending outer wall approximately perpendicular to the carrier along the peripheral edge. The outer wall defines a space for accommodating the cutting filament in the cutterhead and has a guide eyelet disposed therein to define a pass-through opening for guiding the filament from the space to the outside of the cutterhead where a segment of the filament extends radially outwardly from the outer wall to define a cutting plane when the drive shaft rotates. The guide eyelet is made of wear-resistant material and is adapted to the diameter of the cutting filament. A stop is disposed in the cutting plane for receiving the segment of the cutting filament thereagainst when the segment strikes an obstacle and is deflected during operation of the string trimmer. The stop is disposed radially forward of the outer wall next to the pass-through opening.

14 Claims, 5 Drawing Sheets

CUTTERHEAD FOR A STRING TRIMMER

BACKGROUND OF THE INVENTION

In cutterheads, it is known to make the carrier together with the outer wall of the cutterhead out of light material such as plastic, light metal or the like to obtain a reduced weight. A supply spool for the cutting filament is arranged in the cutterhead. An actuation element extends through the spool and actuates an indexing device for metering the cutting filament from the spool. The indexing device is defined by latch noses displaced in elevation and located between the actuating element and the supply spool. By pressing down the actuating element, the latch connection is released in the one latching plane and a relative movement between the cutterhead and the supply spool is made possible until the latch element comes into contact engagement in the second latch plane. The cutting filament is unwound from the spool by means of this relative movement and moves through the pass-through opening provided in the outer wall.

If the cutting filament encounters an obstruction in the cutting plane, then the filament is deflected in a direction opposite to the direction of rotation whereby an intense kink load is applied to the cutting filament at the exit edge of the pass-through opening. The wall of the pass-through opening also receives a corresponding load because of this kink load on the cutting filament which is usually made of plastic. The cutting filament can be sheared off at the elevation of the pass-through opening when the load is too great. This can lead to disturbances of the indexing device because the remaining length of the cutting filament is too short. An unwinding of the cutting filament is no longer obtainable notwithstanding a press-down displacement of the actuating element. To eliminate the disturbance, the cutterhead must be opened which is time consuming and causes an interruption of work. In addition, the intense loads on the wall of the pass-through opening lead to a considerable wear thereby causing the pass-through opening to widen which is associated with a reduction in the guidance of the cutting filament. This too can lead to considerable disturbances of the indexing device. A welding of the cutting filament in the pass-through opening caused by wear cannot be excluded especially in the case of cutterheads made of plastic.

SUMMARY OF THE INVENTION

It is an object of the invention to provide a cutterhead wherein an increased wear in the region of the pass-through opening and a shearing off of the cutting filament at the elevation of the pass-through opening are prevented.

The cutterhead of the invention is for a string trimmer having a rotatable drive shaft. The cutterhead is adapted to hold and meter a cutting filament during operational use thereof and includes: a disc-like carrier having a central opening defining a rotational axis; means for fixedly connecting the carrier to one end of the drive shaft in the opening so as to permit the carrier to rotate about the rotational axis; the carrier having a peripheral edge and a peripherally extending outer wall approximately perpendicular to the carrier along the edge; the outer wall defining a space for accommodating the cutting filament in the cutterhead and having a guide eyelet disposed therein to define a pass-through opening for guiding the filament from the space to the outside of the cutterhead where a segment of the filament extends radially outwardly from the outer wall to define a cutting plane when the drive shaft rotates; the guide eyelet being made of wear-resistant material and being adapted to the diameter of the cutting filament; stop means disposed in the cutting plane for receiving the segment of the cutting filament thereagainst when the segment strikes an obstacle and is deflected during operation of the string trimmer; and, the stop means being disposed radially forward of the outer wall next to the pass-through opening.

The arrangement of an eyelet guiding the cutting filament and made of wear-resistant material such as aluminum or brass substantially prevents wear in the pass-through opening. The cutting filament is guided substantially free of play and lies in the pass-through opening so that it is easily displaceable in its axial direction. The guide eyelet is adapted to the diameter of the cutting filament and can therefore be made to have a small and therefore light configuration so that its weight only slightly increases the centrifugal forces. Stop elements projecting into the cutting plane are provided at the outer edge of the guide eyelet to avoid a shearing off of the cutting filament. The stop elements ensure that the cutting filament comes against the stop element when the cutting filament strikes an obstruction and is deflected opposite to the rotational direction of the cutterhead so that a maximum permissible kink angle of the cutting filament at the pass-through opening can be definitively fixed. A shearing-off of the cutting filament at the elevation of the pass-through opening is reliably prevented in this way.

The contact surface of the stop element facing toward the pass-through opening is advantageously rounded so that the cutting filament comes into conforming contact to the round in dependence upon the deflection of the cutting filament opposite to the rotational direction of the cutterhead. In this way, the cutting filament is kept free of intense kink loadings in this region.

Stop elements are preferably arranged on each side of the pass-through opening in the peripheral direction of the cutterhead so that the kink load applied to the cutting filament is reduced for deflection of the cutting filament opposite to the rotational direction as well as in the rotational direction of the cutterhead.

Preferably, the approximately radial outer edge of the stop element is configured to have a sharp edge so that, when the cutting filament strikes an obstruction, the deflected filament tears off at the sharp edge. The end of the filament which still extends from the sleeve is adequate to effect an unwinding of the cutting filament from the supply spool when the indexing device is actuated so that a new filament segment is available as a cutting element.

A collar projecting radially outwardly and lying approximately parallel to the cutting plane can be provided at the peripheral edge of the outer wall facing away from the carrier and below the cutting plane. In this way, the outer wall from which the cutting filament projects cannot be guided to a position close to an obstruction. Accordingly, a shearing off of the cutting filament (for example, when striking against a sharp-edged obstruction in the cutting plane) is possible maximally to an elevation of the collar edge so that a residual segment remains which projects out beyond the outer wall and which ensures the disturbance-free operation of an indexing device. The outwardly extending residual segment also makes it possible for an operator to manually grasp the cutting filament and to pull the same out of the cutterhead to the desired length.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
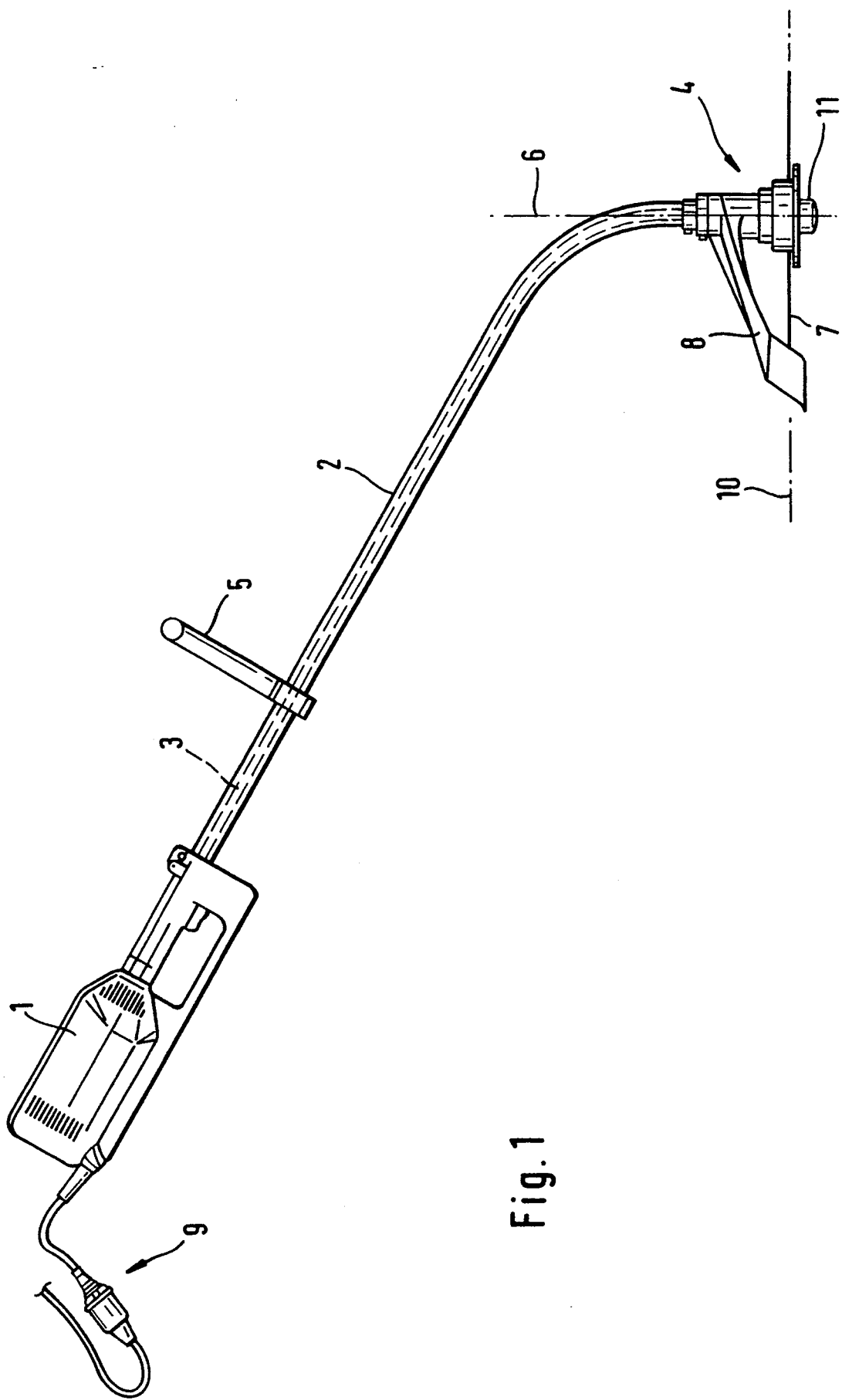
FIG. 1 is a side elevation view of a brushcutter equipped with a cutterhead according to the invention.

The brushcutter of FIG. 1 comprises essentially a drive motor 1 which drives a cutterhead 4 via a bendable shaft 3 journalled in a protective tube 2. The protective tube 2 includes a handle 5 which enables the brushcutter to be held in the work position shown. The cutterhead 4 rotates about a perpendicular axis 6 because of the bent-over end portion of the protective tube 2 in the work position of the brushcutter shown. End segments of a cutting filament 7 project out from the cutterhead 4 with the end segments preferably lying diametrically opposite each other. The end segments of the cutting filament 7 define the filament plane 10 when the cutterhead 4 rotates about the axis 6. This cutting plane 10 is perpendicular to the rotational axis 6.

A protective hood 8 is arranged at the protective tube 2 in the peripheral section of the cutterhead 4 facing toward the operator. The protective hood 8 also limits the length of the cutting filament projecting from cutterhead 4. Preferably, a knife element or the like is mounted in the protective hood 8 which shortens a cutting filament which is too long.

The brushcutter shown in FIG. 1 is driven by an electric drive motor 1 which can be connected to a current source via an electric line 9. In lieu of an electric drive motor, an internal combustion engine such as a two-stroke engine can be provided in order to obtain a freedom of movement independent of the electric line 9.

The cutterhead 4 of the brushcutter is shown in detail in FIGS. 2 to 7. For the sake of clarity, a supply spool for the cutting filament and arranged in the cutterhead is omitted. The actuating element 11 (FIG. 1) for actuating the indexing device for the supply spool is also omitted for clarity. An indexing device of this kind is disclosed, for example, in U.S. Pat. No. 4,893,410 which is incorporated herein by reference.

Figure 2:
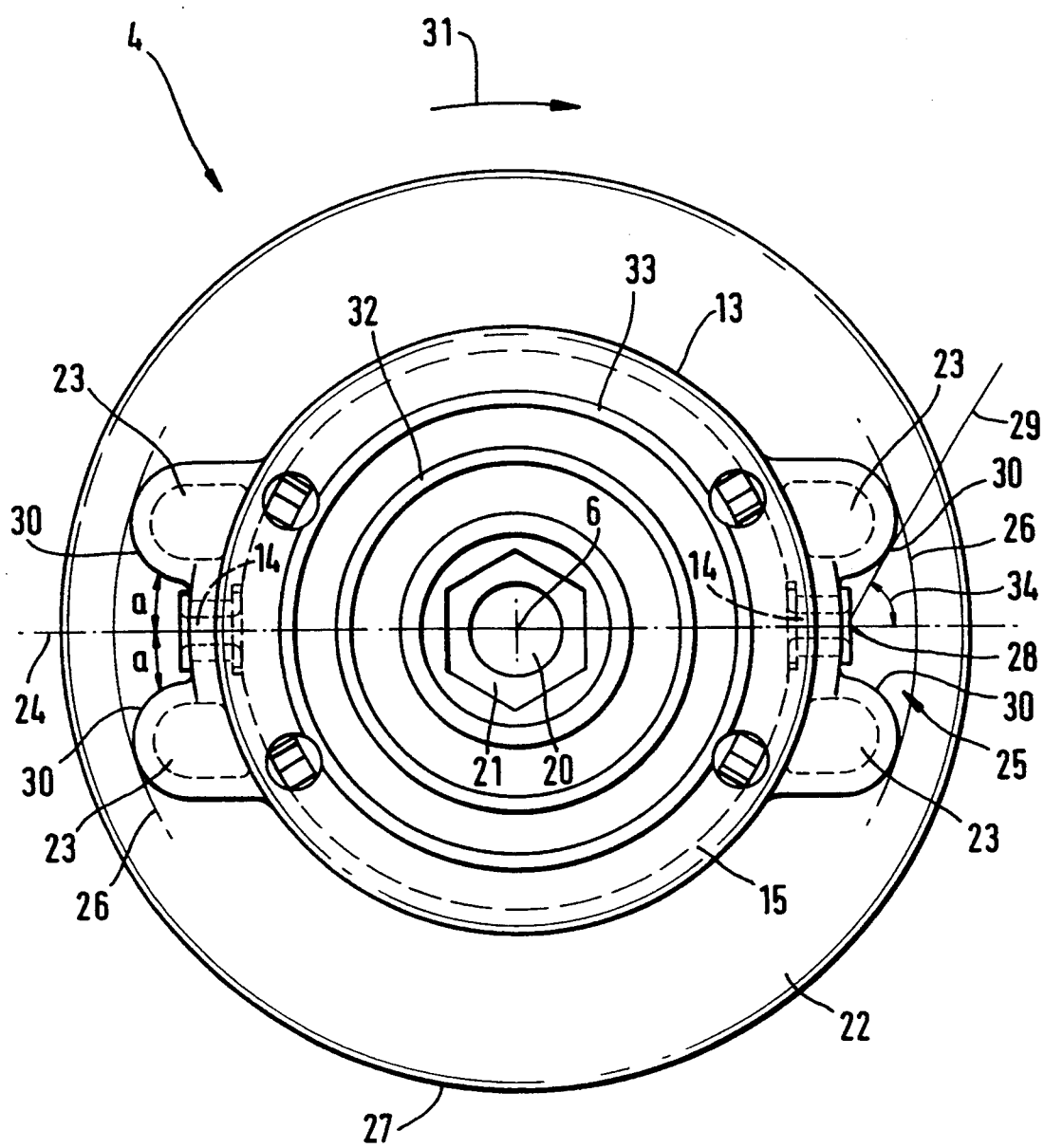
FIG. 2 is a plan view of a disassembled cutterhead.
Figure 3:
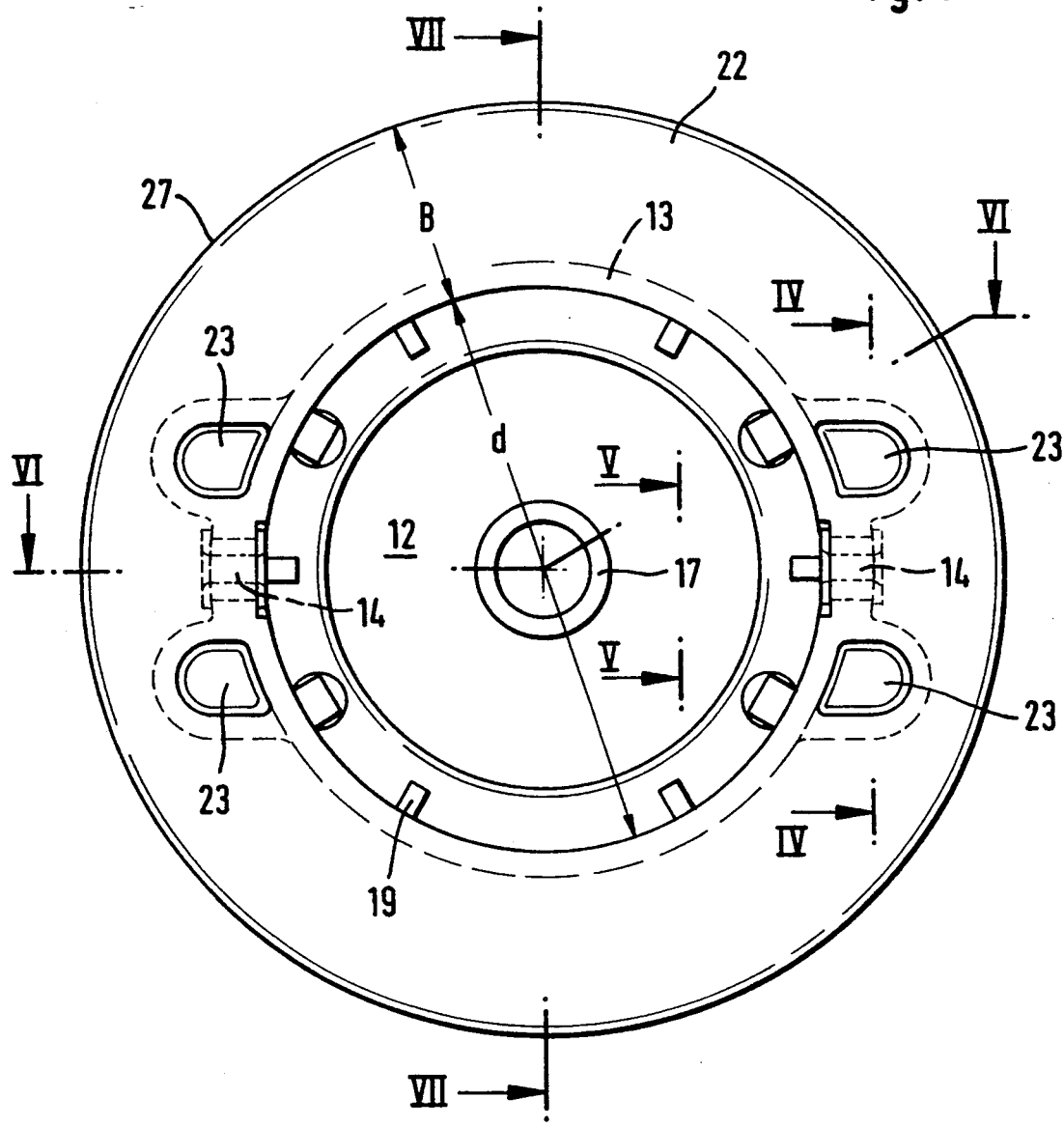
FIG. 3 is a plan view of the cutterhead from below.
Figure 4:
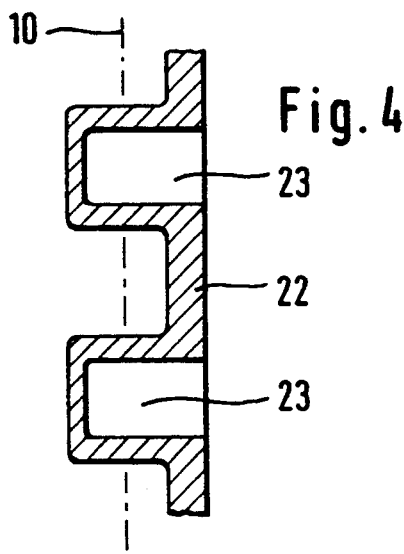
FIG. 4 is a detail section view taken along line IV—IV of FIG. 3.
Figure 5:
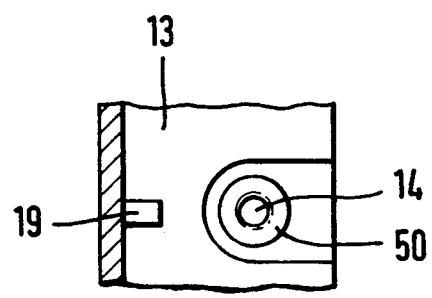
FIG. 5 is a detail section view taken along line V—V of FIG. 3.

The base housing of the cutterhead 4 is shown in FIGS. 2 to 7 and comprises a disc-like carrier 12 with an outer wall 13. The outer wall 13 is disposed at the edge of the carrier and is perpendicular thereto. The outer wall 13 is closed in its peripheral direction and extends over 360°. As shown in FIGS. 3 and 5, at least one guide eyelet 50 is held in the outer wall 13 and is made of a wear-resistant material such as aluminum, brass or the like. The guide eyelet 50 defines a pass-through opening 14 for the cutting filament 7. The cutting filament is held on a supply spool (not shown) within the cylinder defined by the outer wall 13 so that the cutting filament cannot slip out radially from the cutterhead when the cutterhead rotates.

In the embodiment shown, two pass-through openings 14 or guide eyelets 50 are provided which lie diametrically opposite to each other. The outer wall 13 includes a diameter jump disposed near the carrier 12 thereby defining a step 15. The supply spool (not shown) is accommodated in the section 16 of expanded diameter of the cutterhead 4. A cylindrical tube 17 projects through the supply spool and is fixed centrally on the carrier 12. The tube 17 projects with its end facing away from the carrier slightly beyond the edge 18 of the peripheral wall 13. The edge 18 faces away from the carrier 12.

The actuating element 11 (FIG. 1) is held by tube 17 so as to be axially displaceable. With the actuating element 11, the supply spool is displaced in the axial direction in order to bring the latch elements of the indexing device in alternating engagement. The latch elements are arranged on the inner side of the outer wall 13 at different elevations.

Figure 7:
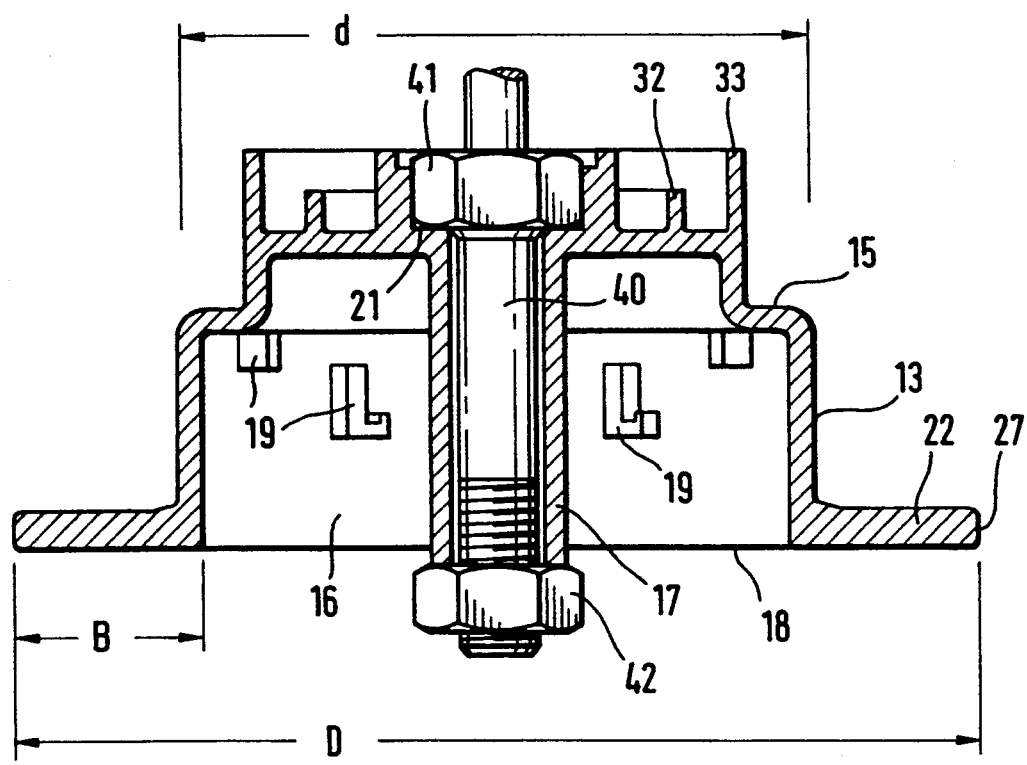
FIG. 7 is a section view taken along line VII—VII of FIG. 3.

The carrier 12 includes a central opening 20 from which the tube 17 extends. The opening 20 as well as the tube 17 function to receive a shaft stub 40 as shown in FIG. 7. An upper form piece 41 lies on the shoulder 21 of the opening 20 formed next to the tube 17. The form piece 41 is disposed form-tight in the opening 20 which is formed so as to be adapted to the form piece 41. The opening 20 has a polygonal cross section when viewed in plan. The cross section corresponds to the outer contour of the form piece 41 of the shaft stub 40. In this way, a rotation-tight connection is provided between the cutterhead 4 and the shaft stub 40. The shaft stub 40 projects out from the end of the tube 17 facing away from the carrier 12. The shaft stub 40 carries a nut 42 whereby the cutterhead 4 is axially tightly clamped between the form piece 41 of the shaft stub 40 and the nut 42. The shaft stub 40 is driven by the bendable shaft 3 journalled in the protective tube 2.

Annular walls (32, 33) are arranged in surrounding concentric relationship to the opening 20 on the side of the carrier 12 facing away from a collar 22. The open end of the protective tube 2 engages between the annular walls (32, 33) to provide a labyrinth-like seal between the cutterhead and the protective tube 2.

A collar 22 is arranged on the peripheral edge 18 of the outer wall 13 facing away from the carrier. The collar 22 projects radially outwardly and is parallel to the carrier 12 and therefore lies at right angles to the rotational axis 6. As shown in FIGS. 3 and 7, the collar 22 has a width B which is equal to or greater than one fourth of the diameter (d) of the cylinder disposed in section 16 and defined by the outer wall 13. The ratio of the outer diameter D of the collar 22 to the outer diameter (d) of the outer wall 13 in section 16 is approximately 1.5.

As shown in FIG. 2, a stop element 23 is provided in the peripheral direction on each side of the pass-through opening 14. The stop element 23 is preferably configured as one piece with the collar 22, the outer wall 13 and the carrier 12. Each stop element extends axially from the collar 22 in a direction toward the plane of the carrier and projects beyond the pass-through opening 14. Each stop element 23 thereby extends through the filament plane 10 determined by the cutting filament 7.

Each stop element 23 is disposed radially forward of the outer wall 13 at the same spacing (a) to the radial longitudinal axis 24 of the pass-through opening 14 when viewed in the peripheral direction. The stop elements 23 are configured so as to be hollow with the end facing away from the carrier 12 being open. Viewed in plan (FIG. 2), the two stop elements 23 associated with a pass-through opening 14 conjointly delimit a funnel 25 tapering radially toward the pass-through opening 14. Both stop elements 23 end at a common circular arc segment 26 centered on the rotational axis 6. The diameter of the circular arc segment 26 is less than the outer diameter D of the collar 22.

The end of the pass-through opening 14 facing toward the radial outer collar edge 27 and the radial longitudinal center axis 24 of this end conjointly define an imaginary intersect point whereat a tangent 29 can be drawn to the stop element 23. The angle 34 defined by the tangent 29 and the longitudinal center axis 24 is preferably greater than 45°. In the embodiment shown, an angle 34 of 60° is provided.

The stop surfaces 30 of the stop elements 23 facing toward the pass-through opening 14 are preferably rounded at a radius which is preferably approximately 8 mm. The stop surfaces 30 provided on both sides of the pass-through opening 14 are preferably configured to have the same radius as seen in the plan view of FIG. 2. It can be purposeful to provide different radii in order to provide the leading contact surface 30 with a smaller radius than the trailing contact surface 30.

A cutting filament projecting out of the pass-through opening 14 is deflected opposite to the rotational direction 31 when striking an obstacle and lies against the trailing contact surface 30. The constructive configuration ensures that the kink angle of the cutting filament in its segment disposed in the pass-through opening 14 and its segment lying against the contact surface 30 of the stop element 23 is not less than 120°. The mechanical load on the cutting filament at the kink location is thereby limited. The peripheral outer edge 50a of the pass-through opening 14 is rounded in order to preclude increased load at the exit from the pass-through opening 14 so that a kind of exit funnel is formed. The inside edge of the pass-through opening 14 is correspondingly rounded.

If the cutterhead 4 is moved up to the obstacle, then the cutting filament would be pushed back up to the collar edge 27. A sharp kink in the cutting filament in the region of the contact surface 30 is prevented because of the rounded contact surface 30. In this way, when the cutting filament strikes an obstacle, a tear-off of the cutting filament is substantially avoided at the region of the pass-through opening 14 because of a kink loading which is too high. The service life of the cutting filament is increased. However, if the cutting filament should be severed, for example, by striking against a sharp-edged obstacle, at least a residual segment remains corresponding to the width of the collar so that, in the event of disturbances at an indexing device provided in the cutterhead, the cutting filament can be drawn off manually from the supply spool disposed in the cutterhead without it being necessary to disassemble the cutterhead itself.

Figure 8:
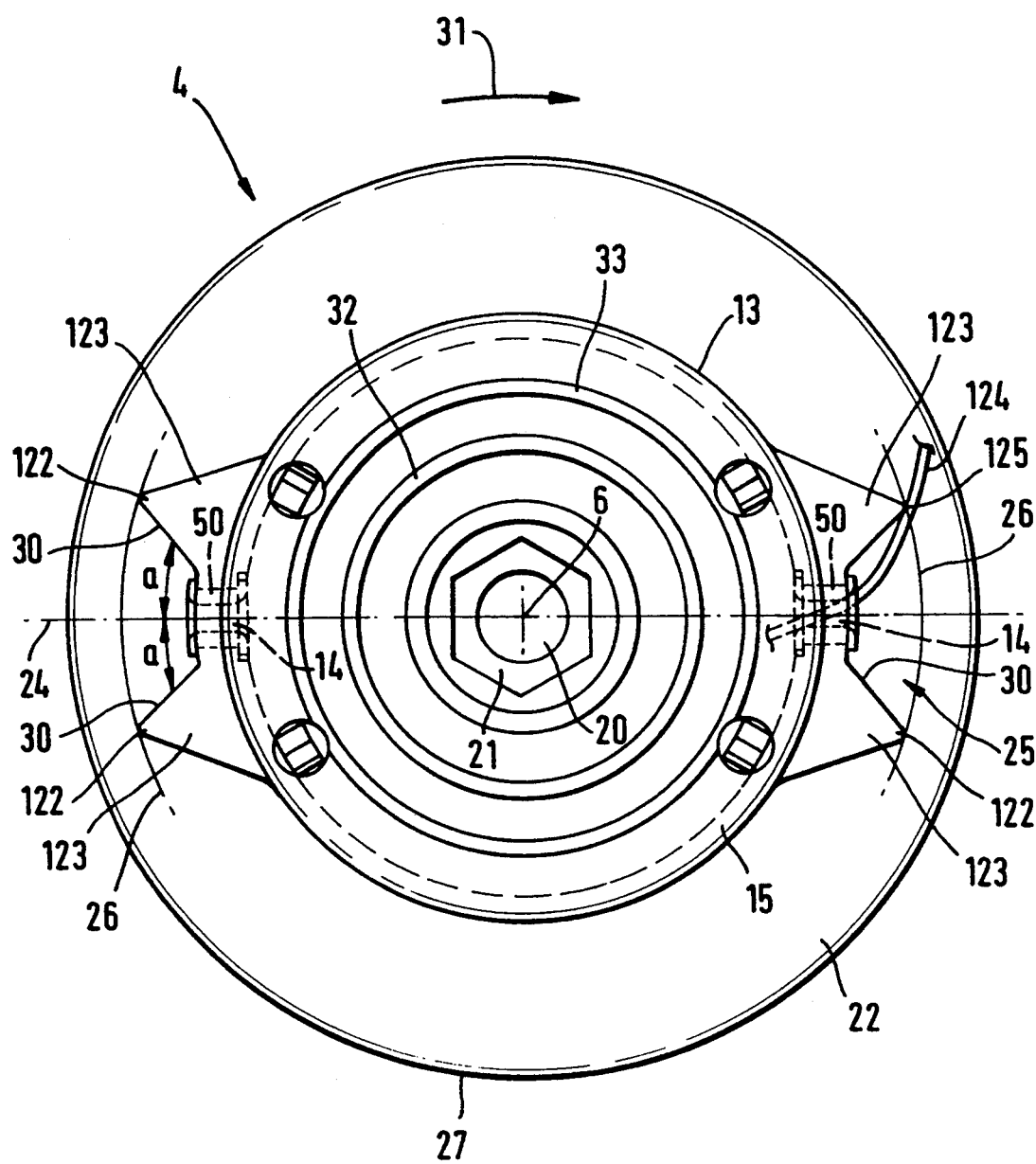
FIG. 8 is a plan view of a disassembled cutterhead provided with stop elements having a different configuration.

The tear-off position of the cutting filament can be advantageously provided in that the radial outer edge 122 of the stop element 22 is configured so as to have a sharp edge as shown in FIG. 8. The edge 122 is approximately perpendicular to the collar 22 and defines the radial outer edge of the contact surface 30 which is configured to be planar. The cutterhead is otherwise configured in the same manner as shown in FIGS. 1 to 7 and, for this reason, all parts are identified by the same reference numerals. In the embodiment of FIG. 8, the contact surface 30 lies at an angle of approximately 40° to 50° to the radial longitudinal center axis 24.

If the cutting filament 24 is greatly deflected in a direction opposite to rotational direction 31 such as when striking an obstacle, then the cutting filament lies against the stop element 123 and is pressed against the sharp edge 122 whereby the tear-off location 125 of the cutting filament 124 is definitively pregiven. The residual segment of the cutting filament 124 extending from the sleeve 50 is sufficient to ensure an unwinding of the cutting filament from the supply spool when the indexing device is actuated. If required, the cutting filament can also be pulled out manually by grasping the remaining residual segment.

Figure 6:
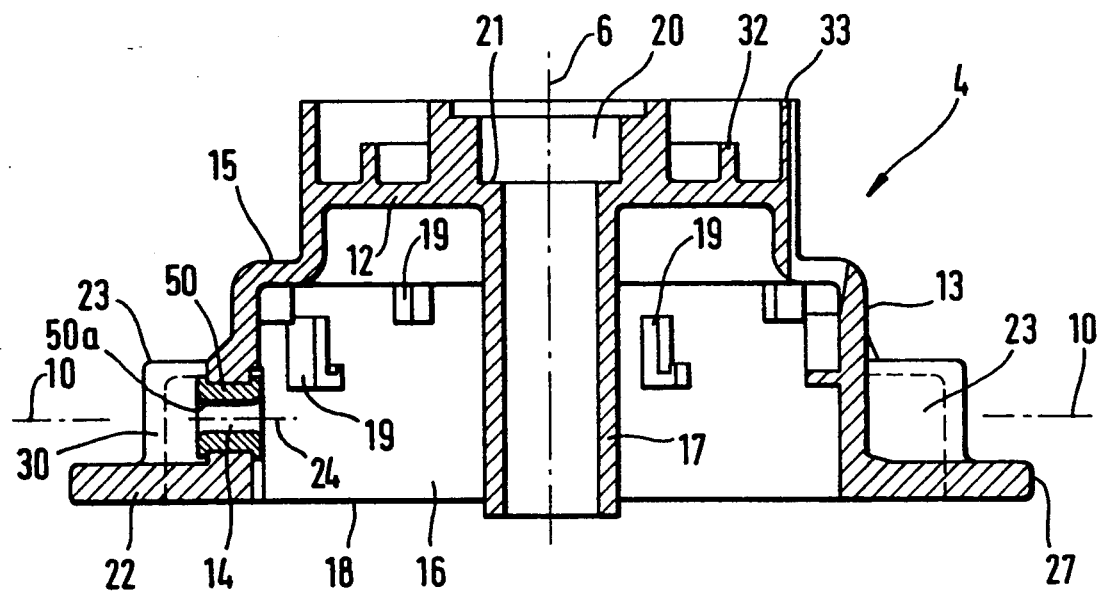
FIG. 6 is a section view taken along line VI—VI of FIG. 3.

The cutterhead can be made of a light metal such as aluminum or the like. Preferably, the cutterhead is made of plastic and especially by injection molding. The guide eyelet 50 is made of a wear-resistant material such as metal in order to provide a tear-resistant guidance of the cutting filament in the region of the pass-through opening 14. The eyelet 50 can be made of metal, for example aluminum or brass and can be buttoned in as shown in FIG. 6. The eyelet 50 can also be provided as a hollow rivet.

It is understood that the foregoing description is that of the preferred embodiments of the invention and that various changes and modifications may be made thereto without departing from the spirit and scope of the invention as defined in the appended claims.

What is claimed is:

1. A cutterhead for a string trimmer having a rotatable drive shaft, the cutterhead being adapted to hold and meter a cutting filament during operational use thereof and comprising:

a disc-like carrier having a central opening defining a rotational axis;

means for fixedly connecting said carrier to one end of said drive shaft in said opening so as to permit said carrier to rotate about said axis;

said carrier having a peripheral edge and a peripherally extending outer wall approximately perpendicular to said carrier along said edge and concentric to said axis;

said outer wall having an outside wall surface and defining an inner space for accommodating the cutting filament in said cutterhead and having a guide eyelet disposed therein to define a pass-through for guiding the filament from said space to the outside of said cutterhead where a segment of said filament extends radially outwardly from said outer wall to define a filament plane when the drive shaft rotates;

said guide eyelet being made of wear-resistant material and being adapted to the diameter of said cutting filament;

said guide eyelet having an end face defining an opening of said pass-through to the outside of said cutterhead and said end face extending radially from said rotational axis a pregiven first radial distance;

stop means disposed in said filament plane for receiving said segment of said cutting filament thereagainst when said segment strikes an obstacle and is deflected during operation of the string trimmer;

said stop means projecting radially outwardly from said outside wall surface so as to be at a pregiven second radial distance from said rotational axis greater than said first radial distance;

said stop means being spaced laterally from said end face in the peripheral direction of said outside wall surface;

said outer wall having a lower end below said filament plane; said lower end being disposed so as to face away from said carrier;

said outer wall having an annular flange extending radially outwardly from said lower end approximately parallel to said filament plane; and, said annular flange extending radially outwardly beyond said stop means a pregiven third radial distance from said rotational axis greater than said second radial distance.

2. The cutterhead of claim 1, said stop means having a rounded surface for receiving said segment of said cutting filament thereagainst and whereat said filament can separate when striking the obstacle whereby a short residual length of said filament remains extending from said opening of said pass-through to permit the operator in manually grasp said length and pull an adequate amount of said cutting filament so that cutting can be resumed; and, said rounded surface being disposed so as to be adjacent said pass-through.

3. The cutterhead of claim 2, said rounded surface having a radius of approximately 8 mm.

4. The cutterhead of claim 2, said pass-through defining a longitudinal center axis and said end face of said eyelet defining a plane; and, said plane of said end face and said longitudinal center axis conjointly defining an imaginary intersect point; a tangent to said rounded surface passing through said intersect point; and, said tangent and said longitudinal center axis conjointly defining an angle of greater than 45°.

5. The cutterhead of claim 4, said angle being 60°.

6. The cutterhead of claim 1, said stop means comprising two stops extending radially outwardly from said outside wall surface on respective sides of said pass-through viewed in the peripheral direction of said outside wall surface; said stops defining respective surfaces facing toward said opening of said pass-through; and, said surfaces of said stops both having the same shape.

7. The cutterhead of claim 6, said surfaces of said stops conjointly defining a funnel tapering radially toward said pass-through when viewed in plan.

8. The cutterhead of claim 7, said surfaces being rounded and said stops having edges disposed radially outwardly from said outside wall surface; and, said edges each being the same radial distance from said rotational axis.

9. The cutterhead of claim 7, said surfaces being flat and said stops having sharp edges adapted to cut said cutting filament when striking the obstacle whereby a short residual length of said filament remains extending from said opening of said pass-through to permit the operator to manually grasp said length and pull an adequate amount of said cutting filament so that cutting can be resumed; said edges being disposed radially outwardly from said outside wall surface; and, said edges each being the same radial distance from said rotational axis.

10. The cutterhead of claim 1, said stop means having a contact surface for receiving said cutting filament thereagainst and said contact surface extending into the outer surface of said outer wall; and, said stop means and said outer wall being formed as a single piece.

11. The cutterhead of claim 1, said outer wall being a cylindrical wall having a diameter (d) and said annular flange having a width B greater than approximately one-fourth of said diameter (d).

12. The cutterhead of claim 1, said carrier, said outer wall and said annular flange conjointly defining a single piece.

13. The cutterhead of claim 1, said stop means being arranged on said annular flange so as to be carried thereby.

14. The cutterhead of claim 13, said stop means comprising two stops projecting radially outwardly from said outside wall surface on respective sides of said pass-through viewed in the peripheral direction of said outside wall surface; said stops having respective ends facing away from said carrier; and, each of said stops being hollow and having an opening in the end thereof facing away from said carrier.

* * * * *